US008407296B2

United States Patent
Mully (10) Patent No.: US 8,407,296 B2
(45) Date of Patent: *Mar. 26, 2013

(54) MULTIPLE AND MULTI-PART MESSAGE METHODS AND SYSTEMS FOR HANDLING ELECTRONIC MESSAGE CONTENT FOR ELECTRONIC COMMUNICATIONS DEVICES

(75) Inventor: Zachariah Mully, Washington, DC (US)

(73) Assignee: Smartbrief, Inc., Washington, DC (US)

( * ) Notice: Subject to any disclaimer, the term of this patent is extended or adjusted under 35 U.S.C. 154(b) by 753 days.

This patent is subject to a terminal disclaimer.

(21) Appl. No.: 11/860,294

(22) Filed: Sep. 24, 2007

(65) Prior Publication Data

US 2009/0083761 A1 Mar. 26, 2009

(51) Int. Cl.
*G06F 15/16* (2006.01)
(52) U.S. Cl. ........................................... 709/206
(58) Field of Classification Search ........... 709/204–206
See application file for complete search history.

(56) References Cited

U.S. PATENT DOCUMENTS

| | | | | |
|---|---|---|---|---|
| 5,428,784 | A * | 6/1995 | Cahill, Jr. ................. | 709/206 |
| 5,781,901 | A | 7/1998 | Kuzma | |
| 6,122,485 | A | 9/2000 | Archer | |
| 6,125,281 | A | 9/2000 | Wells et al. | |
| 6,285,889 | B1 | 9/2001 | Nykänen et al. | |
| 6,295,530 | B1 | 9/2001 | Ritchie et al. | |
| 6,453,259 | B1 | 9/2002 | Infiesto | |
| 6,466,968 | B2 * | 10/2002 | Shirai et al. ............... | 709/206 |
| 6,560,605 | B2 * | 5/2003 | Albers et al. ............... | 1/1 |
| 6,594,349 | B2 | 7/2003 | Fortman | |
| 6,654,601 | B2 | 11/2003 | Picoult et al. | |
| 6,668,043 | B2 | 12/2003 | Hyziak et al. | |
| 6,738,614 | B1 | 5/2004 | Blankenship et al. | |
| 6,856,808 | B1 | 2/2005 | Comer et al. | |
| 6,865,191 | B1 | 3/2005 | Bengtsson et al. | |
| 6,892,217 | B1 * | 5/2005 | Hanmann et al. ............ | 709/200 |
| 6,898,422 | B2 | 5/2005 | Bern et al. | |

(Continued)

FOREIGN PATENT DOCUMENTS

| | | |
|---|---|---|
| EP | 1 737 171 A1 | 12/2006 |
| WO | WO 03/030474 | 4/2003 |

OTHER PUBLICATIONS

Screenshot of message window from Microsoft Outlook. Screenshot taken on Sep. 4, 2009.*

(Continued)

*Primary Examiner* — Larry Donaghue
(74) *Attorney, Agent, or Firm* — Buchanan Ingersoll & Rooney PC.

(57) ABSTRACT

Multiple and multi-part message methods and systems for handling electronic message content for electronic communications devices are presented. An exemplary method for handling electronic message content for an electronic communications device includes: receiving a first electronic message that includes default message content at the communications device; receiving a second electronic message that includes alternate message content at the communications device; determining at the communications device whether the first received message indicates availability of the alternate message content; and if the first received message indicates availability of the alternate message content, automatically providing the alternate message content of the second received message instead of the default message content of the first received message, in response to a user using the communications device to open the first received message indicating availability of the alternate message content or in response to the user using the communications device to open the second received message.

26 Claims, 6 Drawing Sheets

U.S. PATENT DOCUMENTS

| | | | | |
|---|---|---|---|---|
| 6,947,738 B2 | 9/2005 | Skog et al. | | |
| 6,965,926 B1 * | 11/2005 | Shapiro et al. | ............... | 709/219 |
| 6,966,034 B2 * | 11/2005 | Narin | ............... | 715/744 |
| 7,089,286 B1 * | 8/2006 | Malik | ............... | 709/206 |
| 7,114,007 B2 | 9/2006 | Sasaki | | |
| 7,171,190 B2 | 1/2007 | Ye et al. | | |
| 7,478,163 B2 * | 1/2009 | Alda et al. | ............... | 709/229 |
| 7,620,688 B2 * | 11/2009 | Warren et al. | ............... | 709/206 |
| 7,940,195 B2 * | 5/2011 | Fabas et al. | ............... | 340/945 |
| 2001/0018703 A1 | 8/2001 | Miyazawa et al. | | |
| 2001/0049274 A1 | 12/2001 | Degraeve | | |
| 2002/0069296 A1 | 6/2002 | Aua et al. | | |
| 2002/0107002 A1 | 8/2002 | Duncan et al. | | |
| 2003/0023756 A1 | 1/2003 | Awamoto et al. | | |
| 2003/0104805 A1 | 6/2003 | Weksel | | |
| 2003/0139193 A1 | 7/2003 | Buckley | | |
| 2003/0211845 A1 | 11/2003 | Lohtia et al. | | |
| 2004/0043779 A1 | 3/2004 | Oliver et al. | | |
| 2004/0131081 A1 | 7/2004 | Bhatia et al. | | |
| 2004/0181582 A1 | 9/2004 | Lai et al. | | |
| 2004/0259553 A1 * | 12/2004 | Delaney et al. | ............... | 455/445 |
| 2005/0037787 A1 | 2/2005 | Bachner, III et al. | | |
| 2005/0060381 A1 * | 3/2005 | Huynh et al. | ............... | 709/206 |
| 2005/0176449 A1 | 8/2005 | Cui et al. | | |
| 2005/0188039 A1 * | 8/2005 | Charters et al. | ............... | 709/206 |
| 2006/0025119 A1 | 2/2006 | Guida et al. | | |
| 2006/0052089 A1 | 3/2006 | Khurana et al. | | |
| 2006/0121889 A1 | 6/2006 | Contreras Alvarez et al. | | |
| 2006/0133340 A1 | 6/2006 | Rybak et al. | | |
| 2006/0230030 A1 | 10/2006 | Volpa et al. | | |
| 2007/0038717 A1 | 2/2007 | Burkholder et al. | | |
| 2008/0284618 A1 * | 11/2008 | Fabas et al. | ............... | 340/945 |

OTHER PUBLICATIONS

International Search Report and Written Opinion issued in corresponding International Application No. PCT/US2008/010841 dated Apr. 8, 2009.

International Search Report and Written Opinion issued in Co-Pending U.S. Appl. No. 11/859,440 (PCT Application No. PCT/US2008/010842, dated Apr. 8, 2009.

Mully, Zachariah, U.S. Appl. No. 11/859,440, filed Sep. 21, 2007.

Supplemental Search Report dated Aug. 19, 2011, issued in corresponding EP Application No. 21046767.

Office Action dated Oct. 25, 2011 issued in corresponding Korean Patent Application No. 2010-7008628, with translation.

Office Action issued in a corresponding EP application dated Apr. 13, 2012, 5 pps.

Office Action issued in a corresponding KR application with English-language translation dated May 24, 2012, 8 pps.

\* cited by examiner

MULTIPLE AND MULTI-PART MESSAGE METHODS AND SYSTEMS FOR HANDLING ELECTRONIC MESSAGE CONTENT FOR ELECTRONIC COMMUNICATIONS DEVICES

CROSS-REFERENCE TO RELATED APPLICATIONS

This application is a co-pending application of U.S. patent application Ser. No. 11/859,440, filed Sep. 21, 2007.

BACKGROUND

Wireless, handheld electronic communications devices, which enable users to send and receive electronic messages (e.g., e-mail messages, text messages, etc.) on-the-go, may be functionally limited in the kinds of electronic message content they can handle. For example, while a desktop communications device, such as a networked personal computer, might be able to handle various non-text message content (e.g., graphics, images, audio, movies, etc.) that is included in an electronic message, wireless communications devices may not be able to handle such media-rich content due to a lack of software necessary to process media-rich content and/or because the wireless communications protocol with which the device operates does not support media-rich content.

One technique for handling the functionalities associated with different types of communications devices is for an electronic message content provider (e.g., an on-line newsletter subscription service, an on-line retailer, etc.) to transmit multiple versions of the same message content to its users to account for the different types of communications devices the users may employ to open/read the messages. For example, the content provider can send one version of a message that includes content formatted for the functionality of the networked desktop device and another version of the message that includes content formatted for the functionality of the wireless, handheld device. This technique can waste bandwidth resources, however, by requiring the content provider to send two times the number of messages, and can cause confusion for the recipient if both devices share a common e-mail account.

Another technique for handling the functionalities associated with different types of communications devices is to register a particular device, such as the wireless device, to receive messages that include selectable links (e.g., such as a Uniform Resource Locator (URL)) for accessing messages formatted for the registered device. In this case, when a user receives a first message at the registered wireless device that includes the selectable link, the user opens the first message and selects the link to have a second message, which is formatted for the wireless device, downloaded to the device. Usually, the second message can be viewed in the registered device's web browser application. A problem with this technique is that users need to change their normal behavior in opening messages on their wireless devices to look for special messages that include links to alternatively formatted messages, as well as to wait for the alternatively formatted message to be downloaded and displayed.

SUMMARY

Multiple and multi-part message methods and systems for handling electronic message content for electronic communications devices are presented.

An exemplary method for handling electronic message content for an electronic communications device includes: receiving a first electronic message that includes default message content at the communications device; receiving a second electronic message that includes alternate message content at the communications device; determining at the communications device whether the first received message indicates availability of the alternate message content; and if the first received message indicates availability of the alternate message content, automatically providing the alternate message content of the second received message instead of the default message content of the first received message, in response to a user using the communications device to open the first received message indicating availability of the alternate message content or in response to the user using the communications device to open the second received message.

Another exemplary method for handling electronic message content for an electronic communications device includes: receiving at the communications device an electronic message that includes a first part comprising default message content and a second part comprising information for generating alternate message content; processing at the communications device the second part of the received message to generate the alternate message content; and automatically providing the alternate message content instead of the default message content, in response to a user using the communications device to open the received message.

An exemplary system for handling electronic message content over a communications network includes a content provider configured to transmit a first electronic message that includes default message content and a second electronic message that includes alternate message content over the communications network. The system also includes an electronic communications device configured to receive the first electronic message that includes the default message content and the second electronic message that includes the alternate message content over the communications network. The electronic communications device comprises a client agent configured to determine whether the first received message indicates availability of the alternate message content. If the first received message indicates availability of the alternate message content, the client agent is configured to automatically provide the alternate message content of the second received message instead of the default message content of the first received message, in response to a user using the electronic communications device to open the first received message indicating availability of the alternate message content or in response to the user using the communications device to open the second received message.

Another exemplary system for handling electronic message content over a communications network includes a content provider configured to transmit an electronic message that includes a first part comprising default message content and a second part comprising information for generating alternate message content. The system further includes an electronic communications device configured to receive the electronic message that includes the first and second parts over the communications network. The electronic communications device comprises a client agent configured to process the second part of the received message to generate the alternate message content and to automatically provide the alternate message content instead of the default message content, in response to a user using the electronic communications device to open the received message.

BRIEF DESCRIPTION OF THE DRAWINGS

Other objects and advantages of the invention will become apparent to persons skilled in the art upon reading the following detailed description of exemplary embodiments, in conjunction with the accompanying drawings, in which like reference numerals have been used to designate like elements, and in which.

DETAILED DESCRIPTION

A detailed description of methods and systems for handling electronic message content for electronic communications devices is presented below. The explanation will be by way of exemplary embodiments to which the present invention is not limited.

System Overview

Figure 1A:
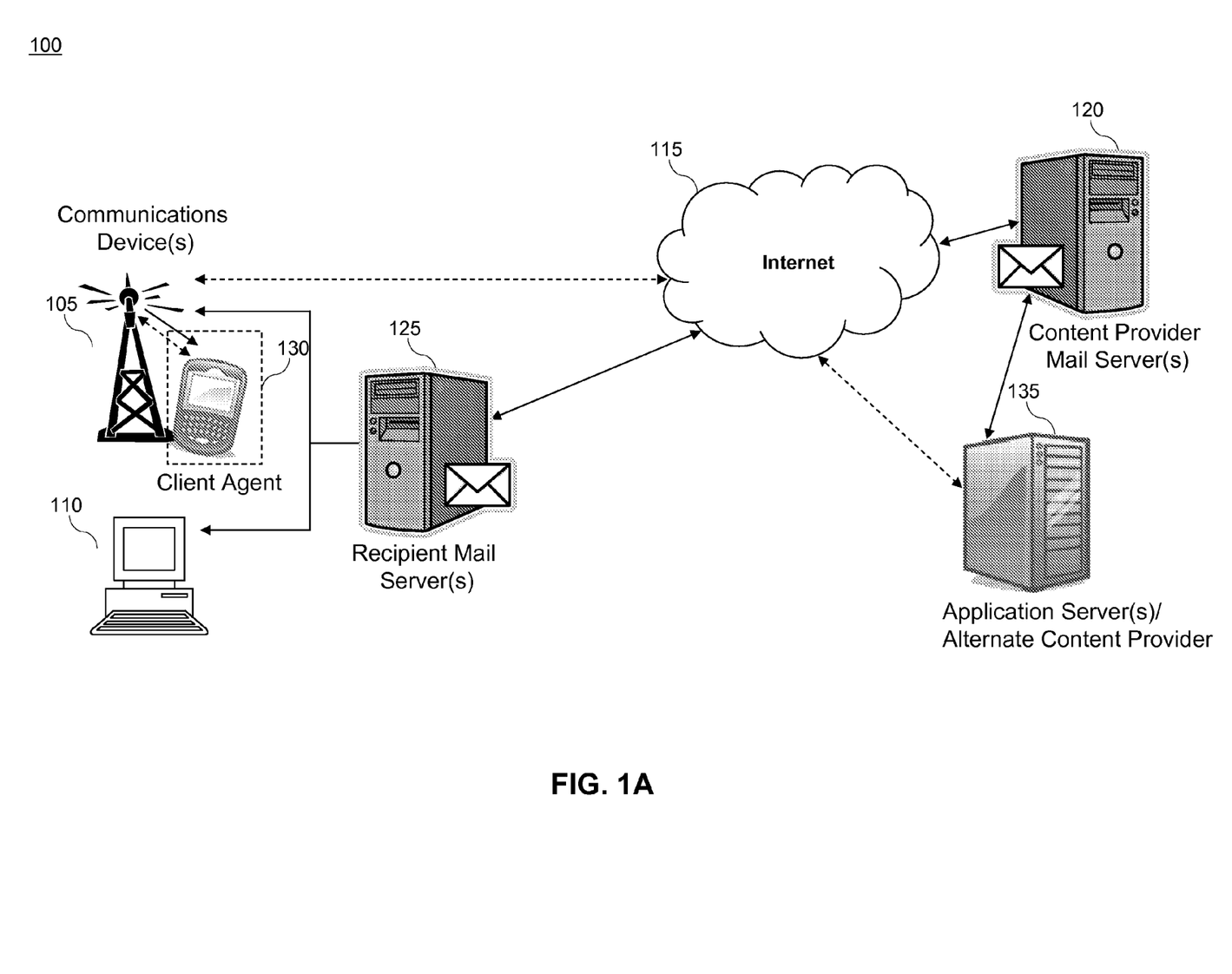
FIG. 1A illustrates an exemplary high-level network for handling electronic message content for electronic communications devices.

FIG. 1A illustrates an exemplary high-level network 100 for implementing a system for handling electronic message content for an electronic communications device(s). Network 100 includes communications devices 105 and 110, recipient mail server(s) 125, content provider mail server(s) 120, and application server(s) 135. As shown in FIG. 1A, the communications devices 105 and 110 and the servers 120, 125 and 135 are configured to communicate with each other via the Internet 115; however, the network 100 can also be implemented as a closed network.

As shown in FIG. 1A, communications device 105 can typically include wireless communications devices, such as BlackBerry®, Palm Treo®, Apple iPhone® or pagers, among other devices, that can communicate with the servers 120, 125 and 135 via a wireless connection through a communications antenna(s). The communications device 110, on the other hand, can typically include non-wireless communications devices, such as networked desktop or laptop computers, among other devices, although such devices need not operate entirely wired and could, for example, be connected via a wireless local area network (LAN). The network 100 is not limited to the communications devices 105 and 110, and can include any number and types of networked communications devices. A messaging application(s), such as Microsoft Outlook® or Mozilla Thunderbird™, among other applications, can operate on the communications devices 105 and 110, which can enable users to send and receive electronic messages, such as e-mail messages, text messages, etc. over the network 100.

The network 100 can be employed in conjunction with, among other services, an on-line messaging service, such as SmartBrief®, which publishes co-branded, customized e-mail newsletters in partnership with leading trade associations, professional societies and corporations, or an on-line retail service, which publishes promotional flyers about products and services, etc. In such services, the content provider (e.g., the newsletter publisher, the retailer, etc.) can transmit electronic messages comprising default message content to their subscribers/users via the content provider mail server(s) 120.

In one embodiment, the default message content can include content that is adapted for the functionality of a default communications device, such as a desktop or laptop personal computer. In this example, the default message content might include media-rich content, such as graphics, images, audio, movies, etc. that cannot be readily displayed on a wireless communications device, for instance. In another embodiment, the default message content can include content that is adapted in accordance with a level of service associated with an electronic messaging service. For instance, in the exemplary e-mail newsletter service, described herein, different subscription levels can be associated with different kinds of message content (e.g., a basic-level subscriber might receive newsletters that include only basic features, while a premium-level subscriber might receive newsletters that include the basic features, as well as additional features not available to the basic-level subscribers).

The content provider (e.g., the newsletter publisher, the retailer, etc.) can also provide alternate message content to the subscribers/users. In one embodiment, the alternate message content can include content that is adapted in accordance with the functionality of a particular communications device. For instance, in the retailer example, if the communications device is a wireless communications device, then the alternate message content can be adapted to consume less bandwidth (e.g., product images that are included in the default message content can be compressed in the alternate message content, color images can be converted to grayscale images, images can be stripped out and replaced with text descriptions, etc.).

In another embodiment, the alternate message content can include content that is adapted in accordance with a level of service associated with an electronic messaging service For instance, in the e-mail newsletter service example, the alternate message content might include content adapted for the premium-level subscription, while the default message content might include content adapted for the basic-level subscription. In this example, the alternate message content might include features not available in the default message content. In yet another embodiment, the alternate message content can include content that is adapted in accordance with the functionality of a particular communications device, as well as with a level of service associated with an electronic messaging service.

FIG. 1A illustrates one server configuration for message content distribution, which includes the mail server 120 that distributes messages comprising the default message content and the application server 135 that distributes the alternate message content. As will be understood by persons skilled in the art, any number of server configurations for content distribution is possible and need not be limited to the configuration illustrated in FIG. 1A. For example, in one embodiment, the mail server 120 and the application server 130 can comprise a single server. In another embodiment, the application server 130 can comprise a plurality of application servers, each configured to generate different alternate message content. For instance, in the exemplary e-mail newsletter service, a first application server can generate the alternate message content associated with a first subscription level and a second application server can generate the alternate message content associated with a second subscription level.

Additionally, as will be understood by persons skilled in the art, any number of business arrangements can be established to distribute message content. For example, a content provider might generate and distribute both the default and alternate message content. In another example, the content provider might contract with a third-party vendor that provides servers and/or hosting for the application code that generates the alternate message content. In this example, the content provider can generate and distribute the default message content via the mail server(s) 120, shown in FIG. 1A, while the third-party vendor can generate (e.g., by converting the default message content) and distribute the alternate message content via the application server(s) 135. In yet another embodiment, the third-party vendor can generate and distribute both the default and alternate message content.

As shown in FIG. 1A, a client agent 130 operates on the communications device 105. As will be understood by persons skilled in the art, the client agent 130 can be employed in conjunction with a computer-based system, where the elements can be implemented in hardware, software, firmware, or combinations thereof. Among other functions, described herein, the client agent 130 can comprise a message reader application, which can filter received electronic messages and/or electronic message content. For example, the client agent 130 can be configured to identify which received messages were transmitted by a particular/predetermined content provider mail server(s) 120. The client agent 130 can also be configured to determine whether alternate message content is available for a particular received message. In this way, the client agent 130 can facilitate the distribution of the alternate message content to the communications device 105. For example, as illustrated in FIG. 1A, the client agent 130 can communicate directly with the application server(s) 135 to obtain the alternate message content. As will be apparent to persons skilled in the art, the client agent 130 can also operate on the communications device 110.

In an embodiment, the client agent 130 can include a tracking application, which can be configured to track the behavior of users as they interact with the alternate message content on the communications device. The client agent 130 can then transmit the tracked data to a central facility of the content provider 120 for further processing. If the client agent 130 does not have the capability to transmit the tracked data, then the client agent 130 can queue and buffer the tracked data until such transmission capability is available. For instance, in the on-line newsletter example, the client agent 130 can be configured to track subscriber click data, which can be aggregated at the central facility to collect information on newsletter open/activity rates, as well as determine popular newsletter issues, topics and stories, among other information. The content provider 120 can then use the collected information to select content (e.g., particular topics and advertisements) and set advertisement rates, etc. for subsequent newsletters.

Process Overview

Figure 1B:
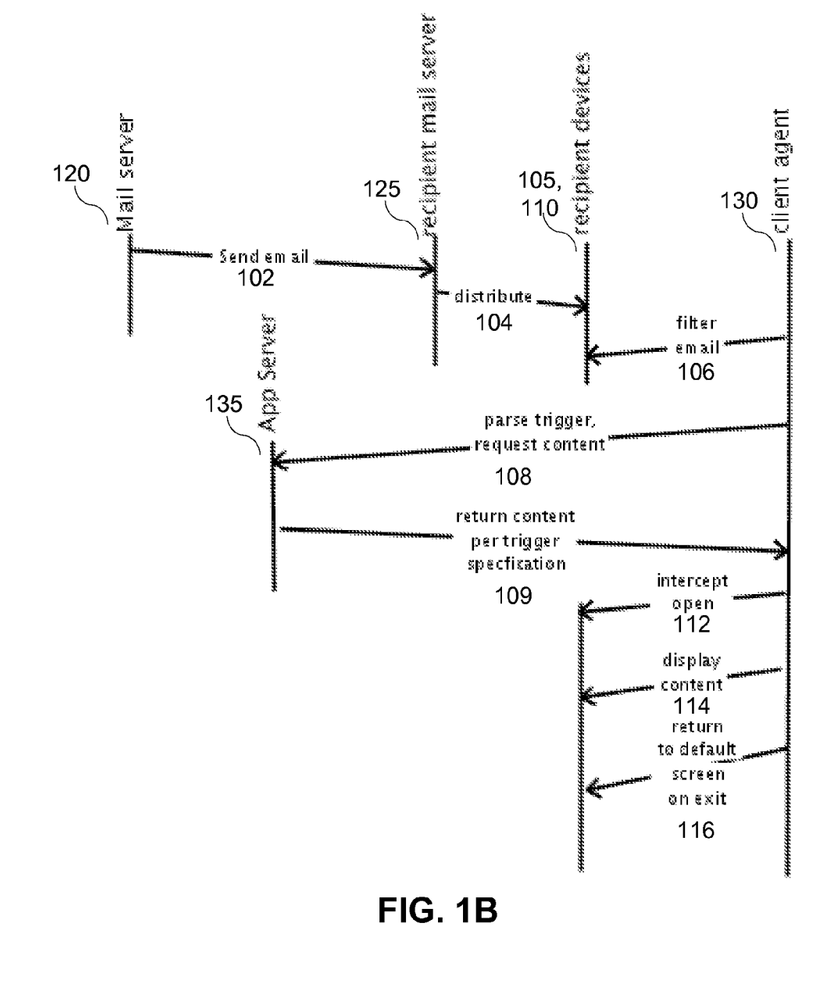
FIG. 1B illustrates exemplary high-level steps for handling electronic message content in the context of the network illustrated in FIG. 1A.

FIG. 1B illustrates exemplary high-level steps for handling electronic message content in the context of the network 100, illustrated in FIG. 1A. Other operational and structural embodiments will be apparent to persons skilled in the art based on the following discussion. These steps are described in detail below.

In step 102, the content provider mail server(s) 120 can send e-mail messages including default message content to the recipient mail server(s) 125 via the Internet 115. In step 104, the recipient mail server(s) 125 can distribute the received e-mail messages to the recipient communications devices 105 and 110. In step 106, the client agent 130 of the communications device 105 can filter the received message according to whether the received message includes a trigger. For example, as described herein in more detail, the trigger can indicate the availability of alternate message content by identifying a predetermined/particular content provider(s) 120 (e.g., via a domain name, a predefined header field, a predefined string, a pre-defined non-string identifier, etc.) and/or by including a predefined element (e.g., a predefined string, a predefined header, a predefined non-string, an element encoded with a predefined encoding scheme in the received message, etc.). That is, the client agent 130 can filter the received message according to whether the received message was transmitted by a predetermined content provider 120 for which alternate message content is available and/or according to whether the received message includes a predefined element that indicates the availability of alternate message content. If the received message includes the trigger, then, in step 108, the client agent 130 can parse/extract data from the trigger and transmit a request to the application server(s) 135 for the alternate message content in accordance with the extracted data. In step 109, the application server(s) 135 can transmit the requested alternate message content to the client agent 130, which can store the alternate message content, for example, in memory on the communications device 105.

In step 112, in response to a user using a messaging application operating on the communications device 105 to open the received message having the trigger, the client agent 130 can intercept the opening of the received message by the messaging application and, in step 114, the client agent 130 can provide the stored alternate message content for display on the communications device 105 instead of the default message content. Then, in step 116, in response to the user closing the received message having the trigger, the client agent 130 can stop displaying the alternate message content and return the display to a default display of the messaging application. In this way, the client agent 130 can seamlessly provide the alternate message content to the user without the user having to alter his or her behavior in opening, closing, or otherwise interacting with messages using the messaging application operating on the communications device 105. These and other steps are described in more detail by way of exemplary embodiments in the description that follows.

Exemplary Embodiments

FIGS. 2-5 illustrate exemplary process steps for a communications device for handling electronic message content. In an embodiment, the process steps can be recorded as a program code that can be executed by a processing device. For example, a message reader application operating on the communications device, depicted in FIGS. 1A and 1B as the client agent 130 of the wireless communications device 105, can be configured to implement the process steps. Not all of the steps of the processes illustrated in FIGS. 2-5 have to occur in the order shown, as will be apparent to persons skilled in the art based on the teachings herein. Other operational and structural embodiments will be apparent to persons skilled in the art based on the following discussion. These steps are described in detail below.

Figure 2:
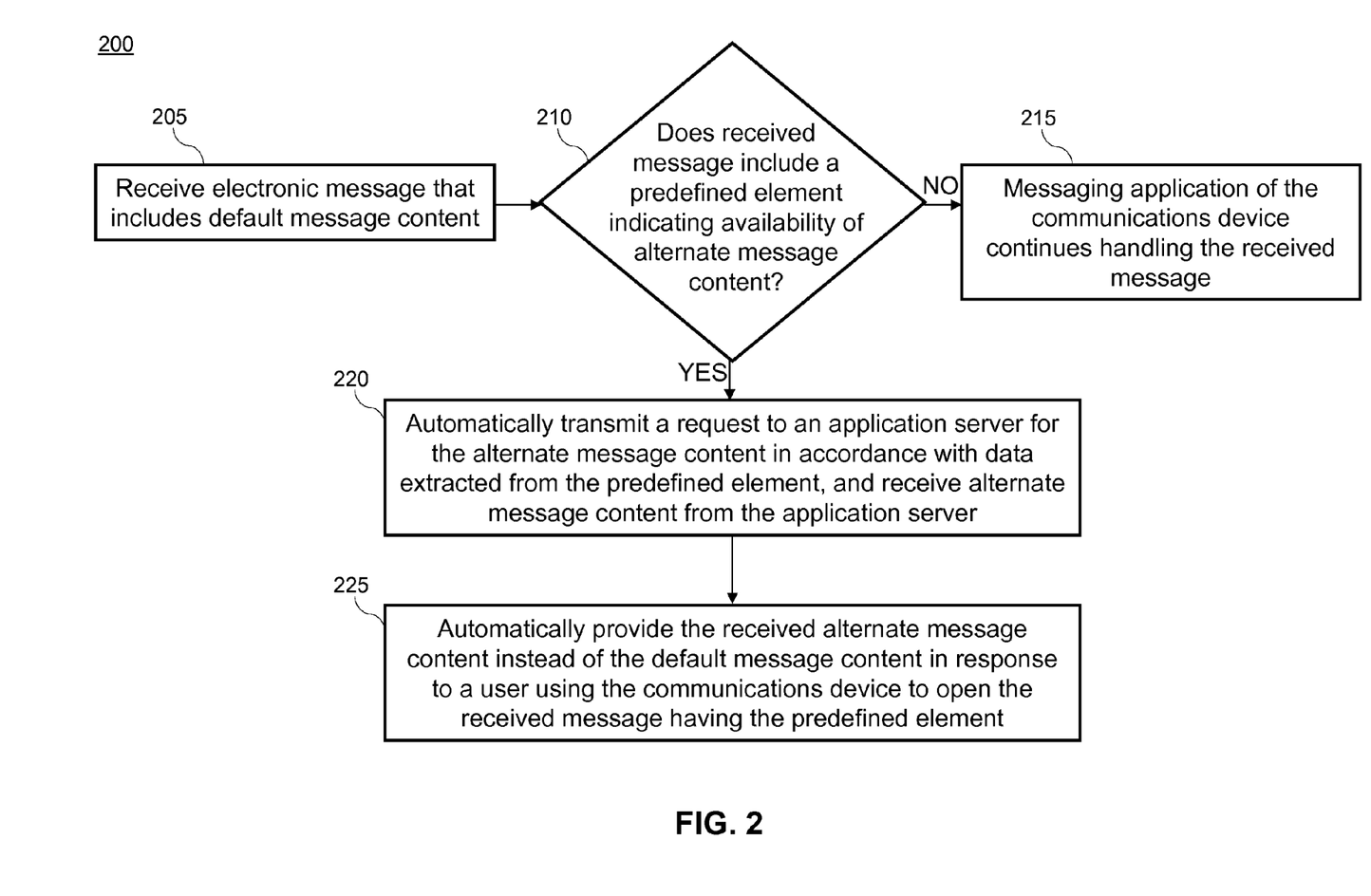
FIGS. 2-5 illustrate process flowcharts providing exemplary steps for handling electronic message content for electronic communications devices, in accordance with embodiments of the present disclosure.

FIG. 2 illustrates exemplary steps for a process 200 for a communications device for handling electronic message content. In step 205, an electronic message that includes default message content is received. For example, as shown in FIGS. 1A and 1B, the client agent 130 of the wireless communications device 105 can receive an e-mail message transmitted by the content provider mail server(s) 120 via the Internet 115 and distributed by the recipient mail server(s) 125. As described herein, the default message content can include message content that is adapted in accordance with the functionality of a default communications device and/or can include content that is adapted in accordance with a level of service associated with an electronic messaging service.

In step 210, it is determined whether the received message further includes a predefined element indicating availability of alternate message content. For example, as shown in FIGS. 1A and 1B, the client agent 130 of the wireless communications device 105 can parse the received e-mail message for the predefined element. The predefined element can comprise, for example, a predefined string, a predefined header, a predefined non-string element (e.g., an image, a graphics element, etc.), and/or an element encoded with a predefined encoding scheme (e.g., a string or a non-string element that is encoded with a predefined encoding scheme, which, when decoded, provides particular information), among other characteristics embedded in the default message content.

If the received message does not include the predefined element, then, in step 215, a messaging application of the communications device continues handling the received message. For example, messaging applications, such as Microsoft Outlook® and Mozilla Thunderbird™, among other applications, can operate on a communications device to enable users to open, close, or otherwise interact with received messages, as well as create and send messages. As described herein, a message reader application, depicted as the client agent 130 in FIGS. 1A and 1B, can also operate on the communications device, in conjunction with the messaging application, to handle the electronic message content. In particular, the client agent 130 can determine whether received messages were transmitted by a predetermined content provider and/or whether received messages include a predefined element indicating the availability of alternate message content.

If the received message includes the predefined element, then, in step 220, a request is automatically transmitted to an alternate content provider for the alternate message content in accordance with data extracted from the predefined element. As shown in FIGS. 1A and 1B, the client agent 130 can communicate with the application server(s) 135 to obtain the alternate message content.

For instance, in the e-mail newsletter service example, the data extracted from the predefined element might specify a particular issue of a newsletter for which alternate message content is available and identify the subscriber. In this example, the predefined element in the received message might be formatted as follows: "http://r.smartbrief.com/resp/hNbgnaeZsXyXjbCibGozACJK," where the string "hNbgnaeZsXyXjbCibGozACJK" is an encoded string using a particular coding scheme that can be resolved into an issue identifier and a subscriber identifier. In another example for distributing media-rich content (e.g., a television show), the predefined element might contain identifiers that specify a particular television show and episode for which alternate message content is available. Persons skilled in the art will understand that the predefined element can include any number of predefined and/or arbitrary data fields that can be extracted to provide various information, including information that identifies the alternate message content and/or the subscriber, among other information. The predefined element can also include reserved data fields, which can be populated with future information.

Further, in step 220, the alternate message content is received from the alternate content provider, and the received alternate message content can be stored, for example, in memory on the communications device.

In an embodiment, the alternate message content need not be received from a single alternate content provider, and different parts of the alternate message content can be received from different alternate content providers. For instance, in the e-mail newsletter service example, a user might want to personalize his or her newsletter to include financial report content and weather report content. In this example, in step 220 of the process 200, illustrated in FIG. 2, a first part of the alternate message content can be received from a first alternate content provider (e.g., that generates the alternate message content for the financial report) and a second part of the alternate message content can be received from a second alternate content provider (e.g., that generates the alternate message content for the weather report).

In an embodiment, instead of receiving the alternate message content directly from an alternate content provider, the client agent can receive an electronic message that includes the alternate message content. For example, as shown in FIG. 1A, the application server 135 can transmit the alternate message content to the content provider mail server 120, which can then transmit an electronic message that includes the alternate message content to the communications device 105 via the Internet 115. In another server configuration, the mail server 120 and application server 135 can comprise a single server, which generates the alternate message content and distributes the alternate message content in an electronic message. As described herein, any number of other server configurations can be employed. In this example, in step 205 of the process 200, illustrated in FIG. 2, a first electronic message that includes the default message content is received and, in step 220, a second electronic message that includes the alternate message content is received. As described herein, the alternate message content can be adapted in accordance with the functionality of the communications device and/or in accordance with a level of a service associated with an electronic messaging service.

In step 225 of the process 200, illustrated in FIG. 2, the received alternate message content is provided (e.g., displayed on the communications device) instead of the default message content, in response to a user using the communications device to open the received message having the predefined element. For example, when the user selects the received message having the predefined element for viewing on the communications device, the client agent 130, depicted in FIGS. 1A and 1B, can be configured to intercept the opening of the message by a messaging application operating on the communications device so that the alternate message content is displayed instead of the default message content in a seamless manner. That is, the user is not required to perform any special actions or change his or her behavior in using the communications device to view the alternate message content for the received message having the predefined element. Further, in an embodiment, in step 225, the received alternate message content is no longer provided in response to the user using the communications device to close the received message having the predefined element. In this example, when the alternate message content is no longer displayed, a default display of the messaging application can be displayed, so that it is transparent to the user that the client agent ever handled the received message.

In an embodiment, the received message can be filtered according to whether it was transmitted by a particular/predetermined content provider before it is filtered according to whether it includes the predefined element. In this example, the step 210 of the process 200, illustrated in FIG. 2, can include the additional step of determining whether the received message was transmitted by a predetermined content provider. If the received message was transmitted by the predetermined content provider, then it is determined whether the received message further includes the predefined element indicating availability of alternate message content. If the received message was not transmitted by the predetermined content provider, then the messaging application of the communications device continues handling the received message. That is, the received electronic messages can be filtered so that only those messages transmitted by the predetermined content provider are parsed for the predefined element, thereby protecting the user's privacy with respect to received messages that were not transmitted by the predetermined content provider.

To determine whether the received message was transmitted by the predetermined content provider, the received message can be parsed for an identifier, such as a domain name, a predefined header field (e.g., "Return-Path" header, a self-defined "X-" header, etc.), a predefined string, and/or a predefined non-string identifier, among other elements, that identifies the predetermined content provider. As described herein, the predetermined content provider can include, for example, an e-mail newsletter service, an on-line retailer, etc.

In an embodiment, the predefined element can have several parts, and the parts can be included in the default message content of different received messages. In this example, the client agent can wait to receive all of the parts of the predefined element before transmitting a request to the alternate content provider for all of the alternate message content or, as the client agent receives the parts of the predefined element, the client agent can transmit requests for corresponding parts of the alternate message content.

In this example, in step 210 of process 200, illustrated in FIG. 2, it is determined whether the received message further includes one of the parts of the predefined element. Next, if the received message includes one of the parts of the predefined element, and if all of the parts of the predefined element have been received, then, in step 220, a request can be automatically transmitted to the alternate content provider for the alternate message content in accordance with data extracted from at least one of the parts of the predefined element. Alternatively, if the received message includes one of the parts of the predefined element, and if all of the parts of the predefined element have not been received, then, in step 220, a request can be automatically transmitted to the alternate content provider for a part of the alternate message content in accordance with data extracted from the received part of the predefined element.

In an embodiment, the predefined element can be embedded in a particular portion of the default message content. For example, the predefined element can be embedded in an initial portion of the default message content of the received message so that, in step 220 of the process 200, illustrated in FIG. 2, the client agent can automatically transmit the request to the alternate content provider for the alternate message content without having to wait for the messaging application to download a remaining portion of the received message. That is, because typical messaging applications for wireless devices, and for some non-wireless devices, will only initially download, for example, only the first X kilobytes (kB) of a message and download the remaining XkB of the message at a later time (e.g., when the user opens the message), it can be advantageous for the client agent if the predefined element is embedded in the first XkB of the message. In this way, the client agent need not wait for the messaging application to download the remaining X kB of the message before it can determine whether alternate message content is available.

In an embodiment, the predefined element can be used to facilitate an automatic update of the client agent application, itself. For example, the predefined element can include data that indicates the availability of another version of the client agent operating on the communications device. In this example, if the client agent application has been updated and a newer version of the application is available, then, in step 220 of the process 200, illustrated in FIG. 2, the alternate version of the client agent application is received as the alternate message content. The process 200 can assume that the client agent is already installed and operating on the communications device or, in an alternate embodiment, the process 200 can include an additional step in which the first time a user receives a message from the predetermined content provider, the received message can prompt the user to download and install the client agent application on the communications device.

In an embodiment, if a received message indicates that alternate message content is available, the client agent can check whether the alternate message content was previously received and, if so, the client agent can provide the previously received alternate message content instead of retrieving it again from the alternate content provider. For example, the first time a user opens a received message that includes the predefined element, the client agent can retrieve and store the alternate message content from the alternate content provider, but when the user subsequently re-opens the received message, the client agent can provide the already stored alternate message content instead of retrieving it again. For instance, in the e-mail newsletter service example, the already stored alternate message content might include, among other content, a particular issue of a newsletter, a newsletter template, and/or standard parts of a newsletter, such as advertiser logos and headers, etc.

In an embodiment, whether the alternate message content has been previously received can be determined based on data extracted from the predefined element. For instance, in the e-mail newsletter service example, extracted issue data can be used to determine whether a particular issue of the newsletter was previously received and, in the on-line retailer example, a coupon identifier extracted from the predefined element can be used to determine whether a particular coupon was previously received.

Alternatively, in another embodiment, whether at least part of the alternate message content was previously received can be determined based on an internal mapping generated by the client agent. For example, the client agent can map the received message having the predefined element to the stored alternate message content using a message identifier, such as a message identifier code generated by the messaging application, among other identifiers, instead of using the predefined element as a lookup key.

In this example, in step 220 of the process 200, illustrated in FIG. 2, it is determined whether at least part of the alternate message content was previously received. If at least part of the alternate message content was previously received, then, instead of automatically transmitting a request to the alternate content provider for all parts of the alternate message content in step 220, the previously received part of the alternate message content is automatically provided instead of the default message content, in response to the user using the communications device to open the received message having the predefined element. Further, if at least part of the alternate message content has not been received, then the process 200 can include the additional step of transmitting a request to the alternate content provider for the part of the alternate message content that has not been received.

In an embodiment, if at least part of the alternate message content was previously received, the client agent can determine whether the alternate message content has been updated before providing it to the user. Whether updated alternate message content for the previously received part of the alternate message content is available can be determined based on data extracted from the predefined element. If the extracted data indicates updated content is available, then the client agent can transmit a request to the alternate content provider for the updated alternate message content. Alternatively, in another embodiment, the client agent can periodically poll the alternate content provider to determine whether there is updated alternate message content for a previously received part(s) of the alternate message content. Such features can be useful, for instance, in the e-mail newsletter service example, to provide updated alternate content on developing news stories.

In an embodiment, the client agent can handle periodic interruptions in service on the communications network. In this example, in step 220 of the process 200, illustrated in FIG. 2, a first part of the alternate message content is received from the alternate content provider until communications with the alternate content provider are interrupted. When communications with the alternate content provider are resumed, a second part of the alternate message content is received from the alternate content provider. For example, assume a wireless communications device is being used on a train and the client agent receives a first part of the alternate message content from the alternate content provider, but communications with the alternate content provider are interrupted when the train enters a tunnel. In this case, when communications with the alternate content provider are resumed (e.g., when the train exits the tunnel), the client agent receives a second part of the alternate message content from the alternate content provider.

Figure 3:
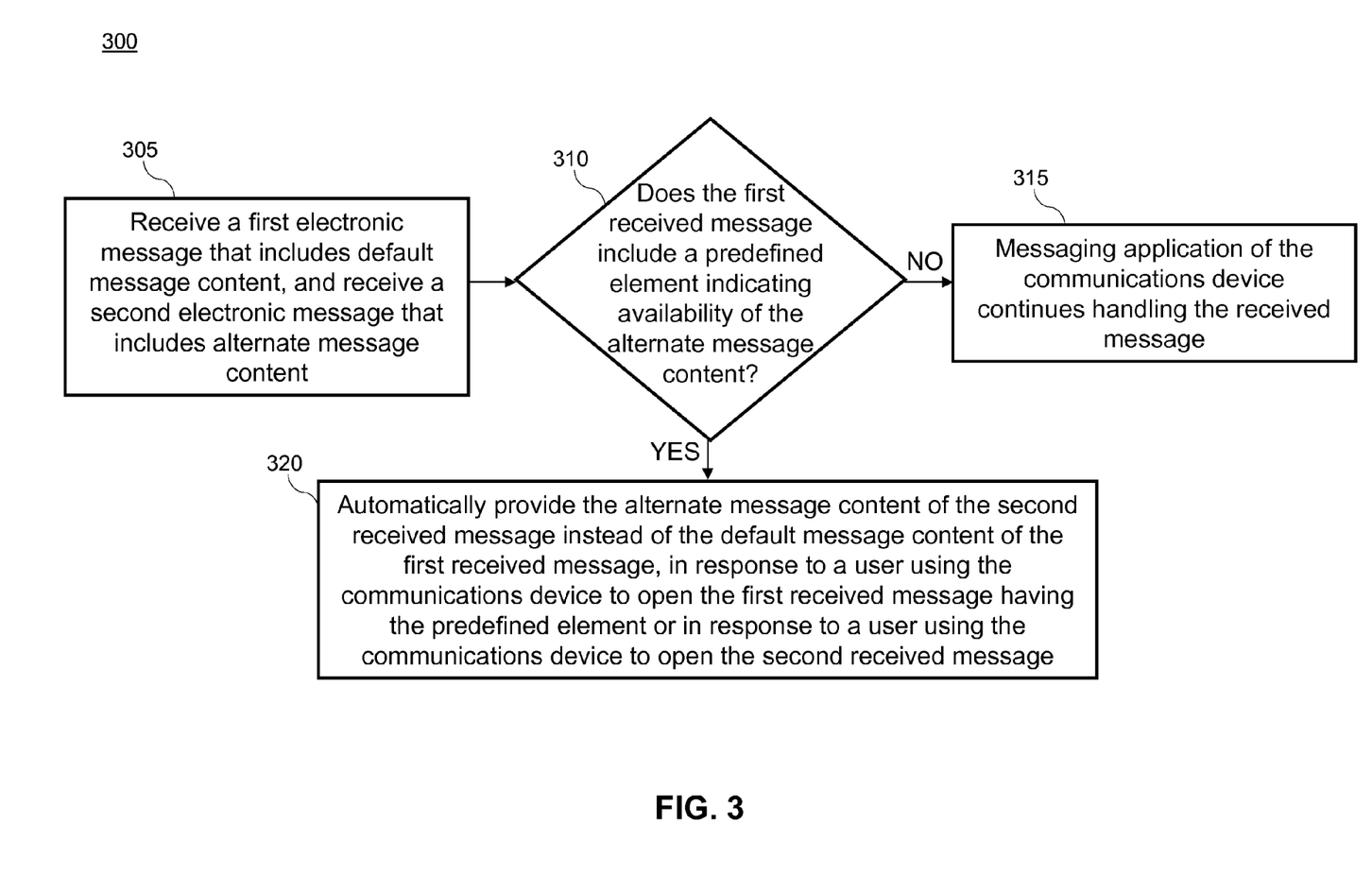

FIG. 3 illustrates exemplary steps for a process 300 for a communications device for handling electronic message content. In the process 300, the alternate message content can be initially transmitted along with the default message content, thereby eliminating the step 220 of the process 200, illustrated in FIG. 2, of transmitting the request to the alternate content provider for the alternate message content.

As shown in FIG. 3, in step 305, a first electronic message that includes default message content and a second electronic message that includes alternate message content are received by the communications device. For example, as shown in FIG. 1A, the wireless communications device 105 can receive the first and second messages distributed by the content provider 120 via the recipient mail server(s) 125. In an embodiment, the content provider 120 can include a default content provider configured to transmit the first message that includes the default message content over the communications network and an alternate content provider configured to transmit the second message that includes the alternate message content over the communications network In step 310, it is determined whether the first received message indicates availability of the alternate message content. For instance, in the embodiment illustrated in FIG. 3, step 310 includes determining whether the first received message includes a predefined element indicating availability of the alternate message content. For example, a message reader application, such as the client agent 130, shown in FIG. 1A, can operate on the communications device 105 and parse the first received message to identify the predefined element. If the first received message does not include the predefined element, then, in step 315, the messaging application of the communications device can continue handling the received message.

Alternatively, in another embodiment, step 310 includes determining whether the first received message was transmitted by a predetermined default content provider. If the first received message was not transmitted by the predetermined content provider, then, in step 315, the messaging application of the communications device can continue handling the received message. In yet another embodiment, step 310 includes determining whether the first received message was transmitted by a predetermined default content provider and, if the first received message was transmitted by the predetermined default content provider, determining whether the first received message includes the predefined element indicating availability of the alternate message content. If the first received message was not transmitted by the predetermined default content provider, or if the first received message was transmitted by the predetermined default content provider but does not include the predefined element, then, in step 315, the messaging application of the communications device can continue handling the received message.

If the first received message indicates availability of the alternate message content, then, in step 320, the alternate message content of the second received message is automatically provided instead of the default message content of the first received message, in response to a user using the communications device to open the first received message indicating availability of the alternate message content or in response to the user using the communications device to open the second received message. For example, in the embodiment illustrated in FIG. 3, if the first received message includes the predefined element, then, in step 320, the alternate message content of the second received message is provided instead of the default message content of the first received message, in response to a user using the communications device to open the first received message having the predefined element or in response to the user using the communications device to open the second received message.

In another embodiment, if the first received message was transmitted by the predetermined content provider, then, in step 320, the alternate message content of the second received message is provided instead of the default message content of the first received message, in response to a user using the communications device to open the first received message transmitted by the predetermined content provider or in response to the user using the communications device to open the second received message. In yet another embodiment, if the first received message was transmitted by the predetermined content provider and the first message includes the predefined element, then, in step 320, the alternate message content of the second received message is provided instead of the default message content of the first received message, in response to a user using the communications device to open the first received message transmitted by the predetermined content provider and having the predefined element or in response to a user using the communications device to open the second received message.

As described herein, the message reader application of the client agent 130, shown in FIG. 1A, can intercept the message opening operation of a messaging application to seamlessly substitute the alternate message content for the default message content. In an embodiment, the step 320 can further include no longer providing the alternate message content, in response to the user using the communications device to close the first received message indicating availability of the alternate message content or to close the second received message.

Figure 4:
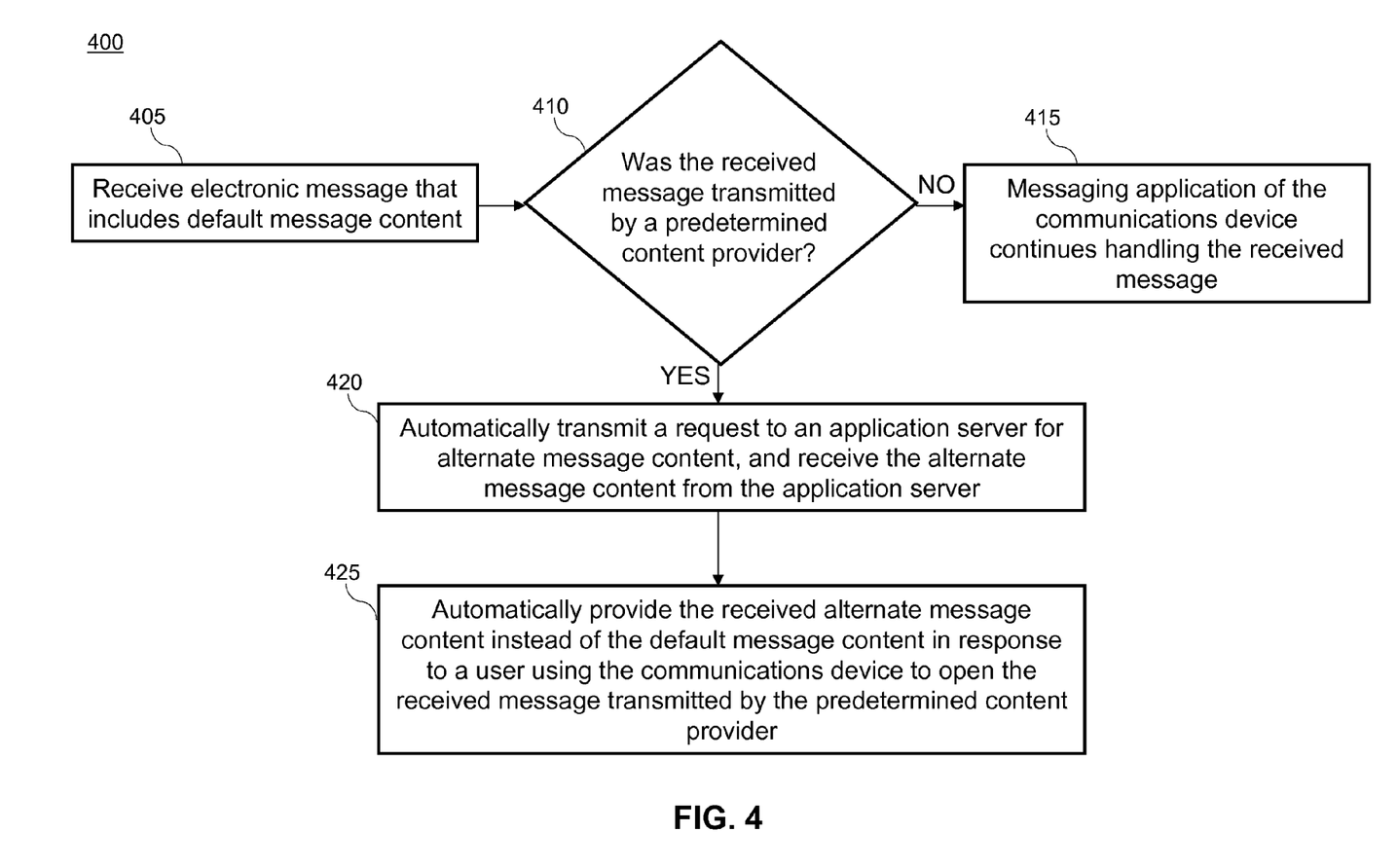

FIG. 4 illustrates exemplary steps for a process 400 for a communications device for handling electronic message content. In the process 400, received messages can be filtered according to whether they were transmitted by a predetermined content provider(s) and alternate message content can be automatically requested for the received messages that were transmitted by the predetermined content provider(s), thereby eliminating the step 210 of the process 200, illustrated in FIG. 2, of determining whether the received message includes a predefined element.

As shown in FIG. 4, in step 405, an electronic message that includes default message content is received by the communications device. For example, as shown in FIG. 1A, the wireless communications device 105 can receive the electronic message from the recipient mail server(s) 125.

In step 410, it is determined whether the received message was transmitted by a predetermined content provider. For example, the message reader application of the client agent 130, shown in FIG. 1A, can operate on the communications device 105 and filter the received messages according to whether they were transmitted by a predetermined content provider(s) 120. As described herein, the client agent can filter received messages based on whether they include an identifier, such as a domain name, a predefined header field (e.g., "Return-Path" header, a self-defined "X-" header, etc.), a predefined string, and/or a predefined non-string identifier, among others, that identifies the predetermined content provider(s). If the received message was not transmitted by the predetermined content provider, then, in step 415, the messaging application of the communications device can continue handling the received message.

If the received message was transmitted by the predetermined content provider, then, in step 420, a request is automatically transmitted to an alternate content provider for alternate message content, and the alternate message content is received from the alternate content provider. For example, the client agent 130 can communicate with the application server(s) 135, as shown in FIGS. 1A and 1B, to obtain the alternate message content. Then, in step 425, the received alternate message content is automatically provided instead of the default message content, in response to a user using the communications device to open the received message transmitted by the predetermined content provider. As described herein, the client agent 130, shown in FIG. 1A, can intercept the message opening operation by the messaging application of the communications device to seamlessly substitute the alternate message content for the default message content.

Figure 5:
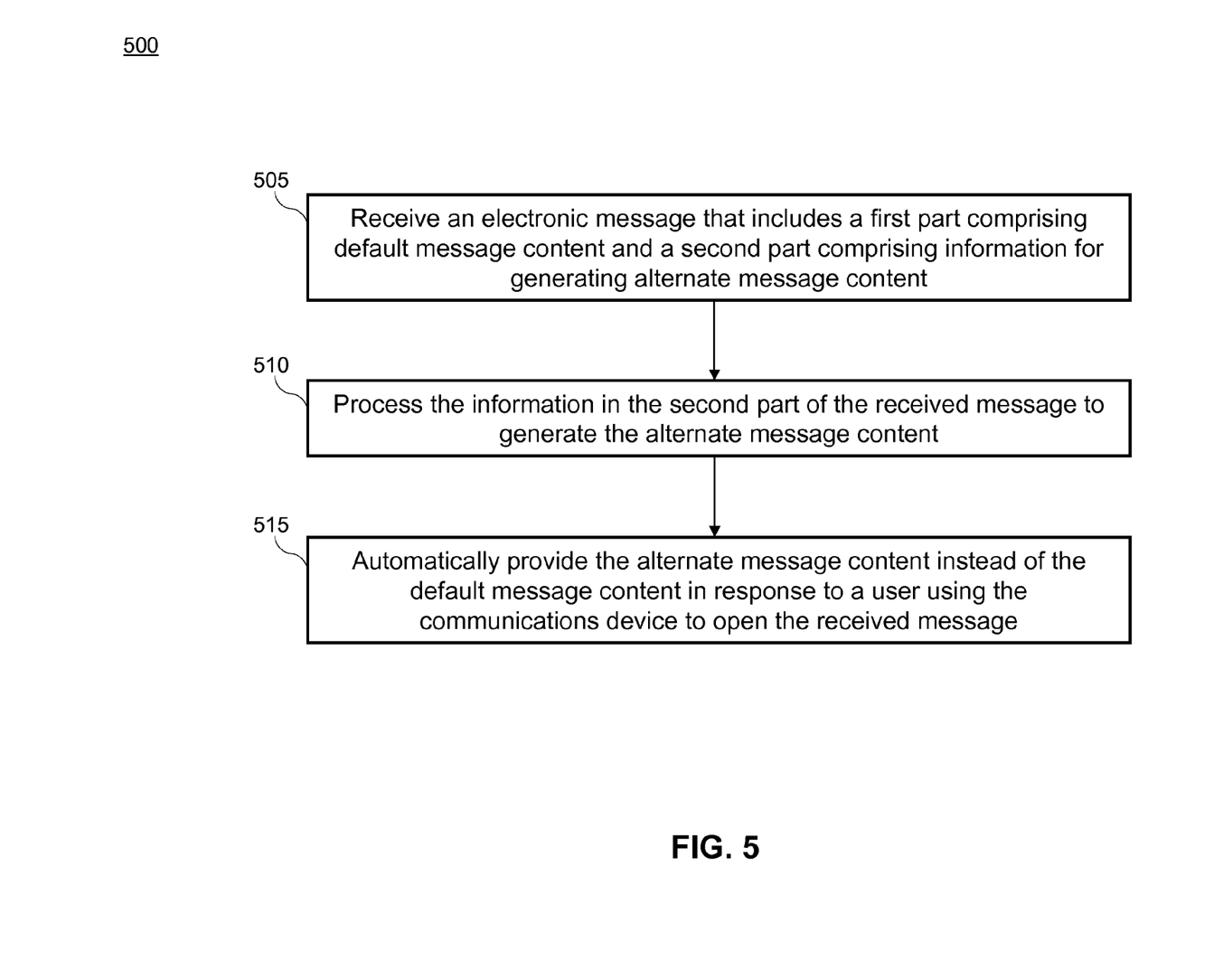

FIG. 5 illustrates exemplary steps for a process 500 for a communications device for handling electronic message content. In the process 500, multi-part received messages, which include information for generating alternate message content, can be processed by a message reader application of the communications device, thereby eliminating the step 220 of the process 200, illustrated in FIG. 2, of transmitting the request to the alternate content provider for the alternate message content.

As shown in FIG. 5, in step 505, an electronic message that includes a first part comprising default message content and a second part comprising information for generating alternate message content is received. For example, as shown in FIG. 1A, the wireless communications device 105 can receive the electronic message from the content provider 120 via the recipient mail server(s) 125. In an embodiment, the content provider 120 can include a default content provider configured to transmit the first part of the message that includes the default message content over the communications network, and an alternate content provider configured to transmit the second part of the message that includes the alternate message content over the communications network.

In an embodiment, the second part of the received message comprises information that cannot be displayed by the communications device without additional processing. Such information can include, for example, binary, text, or extensible markup language (XML) formatted data, among other data, which provide instructions for generating the alternate message content. In an embodiment, the second part of the received message can comprise an attachment to the first part of the received message that includes the default message content.

In an embodiment, step 505 includes determining whether the first part of the received message indicates availability of the alternate message content by determining whether the first part of the received message was transmitted by a predetermined default content provider. In another embodiment, step 505 includes determining whether the first part of the received message indicates availability of the alternate message content by determining whether the first part of the received message includes a predefined element indicating availability of the alternate message content. In yet another embodiment, step 505 includes determining whether the first part of the received message indicates availability of the alternate message content by determining whether the first part of the received message was transmitted by a predetermined default content provider and, if the first part of the received message was transmitted by the predetermined default content provider, by determining whether the first part of the received message includes the predefined element indicating availability of the alternate message content.

In step 510 of the process 500, illustrated in FIG. 5, the second part of the received message is processed to generate the alternate message content. Then, in step 515, the alternate message content is automatically provided instead of the default message content, in response to a user using the communications device to open the received message. For example, the client agent 130, operating on the communications device 105, as shown in FIG. 1A, can process the information in the second part of the received message to generate the alternate message content. Then, instead of the messaging application of the communications device 105 displaying the default message content in response to a user opening the received message, the client agent 130 can seamlessly substitute the alternate message content for the default message content. In an embodiment, step 515 includes no longer providing the alternate message content, in response to the user using the communications device to close the received message.

As described herein, the disclosed embodiments can be employed in conjunction with an on-line messaging service, such as SmartBrief®, which can provide a number of client services. For example, the on-line messaging service can generate summaries of news articles most relevant to a subscriber and provide links in the summaries to corresponding full article(s). The service can process and create such full article summaries using a combination of computer technologies, as well as human editorial skill. In another example, the service can dynamically generate machine summaries of the full articles. Such machine-generated summaries of the full articles can reduce the amount of time subscribers spend reading each article, without losing any of the context or importance of the article. In this example, the level of summarization can be customized by the subscriber and can be performed in real time. These summary services can be advantageous on device platforms having limited screen size.

By leveraging existing technologies for format-constrained devices, the on-line messaging service can provide alternate representations of newsletter content, such as advertising, summaries and articles, that are specifically formatted for a particular device. That is, as described herein, full articles, images, video and audio content, etc. can be optimized for various format constraints of the subscribers' devices.

The on-line messaging service can provide a mechanism for secure distribution of sensitive internal data. For example, as described herein, messages transmitted by the content provider can include encoded predefined elements/triggers, which can be extracted by the client agent running on each subscriber's device. Configuring e-mail messages to contain nothing more than an encoded trigger(s) can render such e-mail messages useless to devices not having the client agent installed. In this way, the on-line messaging service can distribute sensitive, non-forwardable, and non-printable information via e-mail messages without necessitating a change in subscriber/user behavior.

The on-line messaging service can also provide an issue archive service to enable subscriber access to archived versions of newsletters via an easy-to-use interface. Subscribers can also use the messaging service to flag summaries and/or articles in a particular newsletter for subsequent viewing. The subscribers can then access the flagged content via a subscriber account on a messaging service website.

The on-line messaging service can provide subscriber search capabilities to enable subscribers to focus on specific areas of interest covered by a newsletter. Such search functionality can leverage the same technologies the messaging service uses during newsletter creation, including site-specific filters (e.g., to filter out content from non-specified web sites) and spidering (e.g., to search for content only from specific web sites), industry-specific/vertical taxonomies that enable focused searches more likely to produce the desired content, and press release feeds. A subscriber can run news searches on the messaging service website and save his or her frequent news searches. The service can also make the subscriber's search results available via rich site summary (RSS) feeds for further integration into the subscriber's daily routine. In addition to saved searches, the messaging service can enable subscribers to set alerts for breaking news or changes in news. The messaging service can deliver these alerts in a variety of ways, such as via e-mail or short message service (SMS) messages.

Additional services that the on-line messaging service can provide include "tell-a-friend" features. For example, an "e-mail-this-story" feature can enable a subscriber to easily forward an interesting story from a newsletter to his or her friends, colleagues, co-workers, etc., including a short personalized message from the subscriber to the recipient, and an "e-mail-this-brief" feature can enable a subscriber to easily forward an entire newsletter to his or her friends, colleagues, co-workers, etc., including a short personalized message from the subscriber to the recipient.

The messaging service client agent can be configured to integrate services with a subscriber device's phone, calendar and addressbook. In this way, for example, subscribers can place calls to an advertiser directly from an advertisement in a newsletter being viewed on their device, add events being advertised in a newsletter to the their personal calendar, and use their personal addressbooks as a source for the tell-a-friend features, described herein, enabling the subscriber to easily forward interesting stories and/or entire newsletters to persons in their addressbooks.

The on-line messaging service can seek out and integrate exclusive content from third parties to provide to its subscribers, such as white papers, surveys and no-fee access to otherwise subscription-only content. Additional content can include stock quotes, which can be provided along with exclusive company profile data. Further, the on-line messaging service can process, index and provide press releases from various industry sources (e.g., Businesswire and PRNewswire) that can be fully searchable on the messaging service website, as well as included in newsletters, when appropriate. The messaging service can offer its newsletter content, as well as many other sources of information, such as predefined industry topics, via RSS. The messaging service can also provide a job service, for example, by offering employers premium visibility to advertise open positions in appropriate newsletters. By integrating the job openings directly into newsletters, as well as on the message service website, the job service can deliver targeted job opening information to subscribers.

Further, by leveraging on its content distribution platform and database-driven content creation methods, the on-line messaging service can enable a subscriber to customize nearly all aspects of the newsletters including, for example, articles, sections, advertising, etc. that are displayed within the newsletter. Additionally, subscriber-selectable navigation can enable subscribers to customize the display and navigation of their newsletter, for example, to display newsletter content by headline, section, or all on a single page, etc.

In the preceding descriptions, the exemplary embodiments refer to wireless and handheld electronic communications devices. Naturally, other types of electronic communications devices would benefit from the disclosed invention. For example, devices that communicate using communications protocols, which limit bandwidth or restrict communication to a degree, thereby not allowing for media-rich content in a typical communications scenario, such as in wireless e-mail services or SMS pager services, among others.

Conclusion

The present invention has been described with reference to several exemplary embodiments, however, it will be readily apparent to persons of skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for handling electronic message content for an electronic communications device, comprising:
   receiving a first electronic message that includes default message content at the communications device;
   determining at the communications device whether the first received message indicates availability of alternate message content;
   receiving a second electronic message that includes alternate message content at the communications device; and
   when the first received message indicates availability of the alternate message content, preventing the display of the first received message and automatically providing the alternate message content of the second received message instead of the default message content of the first received message, in response to a user using the communications device to open the first received message indicating availability of the alternate message content or in response to the user using the communications device to open the second received message.

2. The method of claim 1, wherein the step of determining whether the first received message indicates availability of the alternate message content comprises:
   determining whether the first received message was transmitted by a predetermined default content provider.

3. The method of claim 1, wherein the step of determining whether the first received message indicates availability of the alternate message content comprises:
   determining whether the first received message includes a predefined element indicating availability of the alternate message content.

4. The method of claim 3, wherein the step of determining whether the first received message indicates availability of the alternate message content comprises:

determining whether the first received message was transmitted by a predetermined default content provider and, when the first received message was transmitted by the predetermined default content provider, determining whether the first received message includes the predefined element indicating availability of the alternate message control.

5. The method of claim 1, wherein the step of automatically providing the alternate message content of the second received message instead of the default message content of the first received message comprises:

no longer providing the alternate message content, in response to the user using the communications device to close the first received message indicating availability of the alternate message content or to close the second received message.

6. A method for handling electronic message content for an electronic communications device, comprising:

receiving at the communications device an electronic message that includes a first part comprising default message content and a second part comprising information for generating alternate message content;

processing at the communications device the second part of the received message to generate the alternate message content; and preventing the display of the default message content and automatically providing the alternate message content instead of the default message content, in response to a user using the communications device to open the received message.

7. The method of claim 6, wherein the step of receiving the electronic message comprises:

determining at the communications device whether the first part of the received message indicates availability of the alternate message content by determining whether the first part of the received message was transmitted by a predetermined default content provider.

8. The method of claim 6, wherein the step of receiving the electronic message comprises:

determining at the communications device whether the first part of the received message indicates availability of the alternate message content by determining whether the first part of the received message includes a predefined element indicating availability of the alternate message content.

9. The method of claim 8, wherein the step of determining whether the first part of the received message indicates availability of the alternate message content comprises:

determining whether the first part of the received message was transmitted by a predetermined default content provider and, when the first part of the received message was transmitted by the predetermined default content provider, determining whether the first part of the received message includes the predefined element indicating availability of the alternate message content.

10. The method of claim 6, wherein the step of automatically providing the alternate message content instead of the default message content comprises:

no longer providing the alternate message content, in response to the user using the communications device to close the received message.

11. A physical recording medium on which the method of claim 6 is recorded as a program code that can be executed by a processing device.

12. A system for handling electronic message content over a communications network, comprising:

a content provider configured to transmit a first electronic message that includes default message content and a second electronic message that includes alternate message content over the communications network; and an electronic communications device configured to receive the first electronic message that includes the default message content and the second electronic message that includes the alternate message content over the communications network, wherein the electronic communications device comprises a client agent configured to determine whether the first received message indicates availability of the alternate message content, and wherein the first received message indicates availability of the alternate message content, the client agent is configured to intercept the first received message and automatically provide the alternate message content of the second received message instead of the default message content of the first received message, in response to a user using the electronic communications device to open the first received message indicating availability of the alternate message content or in response to the user using the electronic communications device to open the second received message.

13. The system of claim 12, wherein the client agent is configured to determine whether the first received message indicates availability of the alternate message content based on whether the first received message was transmitted by a predetermined default content provider.

14. The system of claim 12, wherein the client agent is configured to determine whether the first received message indicates availability of the alternate message content based on whether the first received message includes a predefined element indicating the availability of the alternate message content.

15. The system of claim 14, wherein the client agent is configured to determine whether the first received message indicates availability of the alternate message content based on whether the first received message was transmitted by a predetermined default content provider and, when the first received message was transmitted by the predetermined default content provider, based on whether the first received message includes the predefined element indicating availability of the alternate message content.

16. The system of claim 12, wherein the client agent is configured to no longer provide the alternate message content, in response to the user using the communications device to close the first received message indicating availability of the alternate message content or to close the second received message.

17. The system of claim 12, wherein the content provider comprises:

a default content provider configured to transmit the first message that includes the default message content over the communications network; and an alternate content provider configured to transmit the second message that includes the alternate message content over the communications network.

18. A system for handling electronic message content over a communications network, comprising:

a content provider configured to transmit an electronic message that includes a first part comprising default message content and a second part comprising information for generating alternate message content; and an electronic communications device configured to receive the electronic message that includes the first and second parts over the communications network, wherein the electronic communications device comprises a client agent configured to process the second part of the received message to generate the alternate message content and to prevent the generation of the default message content and automatically provide the alternate message content instead of the default message content, in response to a user using the electronic communications device to open the received message.

19. The system of claim 18, wherein the client agent is configured to determine whether the first part of the received message indicates availability of the alternate message content based on whether the first part of the received message was transmitted by a predetermined default content provider.

20. The system of claim 18, wherein the client agent is configured to determine whether the first part of the received message indicates availability of the alternate message content based on whether the first part of the received message includes a predefined element indicating the availability of the alternate message content.

21. The system of claim 20, wherein the client agent is configured to determine whether the first part of the received message indicates availability of the alternate message content based on whether the first part of the received message was transmitted by a predetermined default content provider and, when the first part of the received message was transmitted by the predetermined default content provider, based on whether the first part of the received message includes the predefined element indicating availability of the alternate message content.

22. The system of claim 18, wherein the client agent is configured to no longer provide the alternate message content, in response to the user using the communications device to close the received message.

23. The system of claim 18, wherein the content provider comprises:
 a default content provider configured to transmit the first part of the message that includes the default message content over the communications network; and
 an alternate content provider configured to transmit the second part of the message that includes the alternate message content over the communications network.

24. The system of claim 18, wherein the default message content is adapted for at least one of 1) functionality of the default communications device and 2) level of service associated with the electronic messaging service, and wherein the alternate message content is adapted for at least one of 1) functionality of an alternate communications device and 2) an alternate level of service associated with the electronic messaging service.

25. The system of claim 12, wherein the default message content is adapted for at least one of 1) functionality of the default communications device and 2) level of service associated with the electronic messaging service, and wherein the alternate message content is adapted for at least one of 1) functionality of an alternate communications device and 2) an alternate level of service associated with the electronic messaging service.

26. The method of claim 1, wherein the default message content is adapted for at least one of 1) functionality of the default communications device and 2) level of service associated with the electronic messaging service, and wherein the alternate message content is adapted for at least one of 1) functionality of an alternate communications device and 2) an alternate level of service associated with the electronic messaging service.

* * * * *